United States Patent
Lebreton et al.

(10) Patent No.: US 11,413,115 B2
(45) Date of Patent: Aug. 16, 2022

(54) TOOTH CLEANING SYSTEM, POWDER CONTAINER AND INSERT FOR A POWDER CONTAINER

(71) Applicant: FERTON HOLDING S.A., Delémont (CH)

(72) Inventors: Etienne Lebreton, Crissier (CH); Florent Jean-Claude Georges Beani, Gex (FR); Tiago Bertolote, Geneva (CH); Marcel Donnet, St. Jean de Gonville (FR)

(73) Assignee: FERTON HOLDING S.A., Delémont (CH)

( * ) Notice: Subject to any disclaimer, the term of this patent is extended or adjusted under 35 U.S.C. 154(b) by 0 days.

(21) Appl. No.: 16/336,522

(22) PCT Filed: Sep. 12, 2017

(86) PCT No.: PCT/EP2017/072793
§ 371 (c)(1),
(2) Date: Mar. 26, 2019

(87) PCT Pub. No.: WO2018/054716
PCT Pub. Date: Mar. 29, 2018

(65) Prior Publication Data
US 2021/0275280 A1 Sep. 9, 2021

(30) Foreign Application Priority Data
Sep. 26, 2016 (DE) ...................... 10 2016 118 081.5

(51) Int. Cl.
*A61C 3/025* (2006.01)
*B24C 7/00* (2006.01)

(52) U.S. Cl.
CPC ............ *A61C 3/025* (2013.01); *B24C 7/0061* (2013.01)

(58) Field of Classification Search
CPC .............................. A61C 2/025; B24C 7/0061
(Continued)

(56) References Cited

U.S. PATENT DOCUMENTS 2,759,266 A 8/1956 Cassani
3,852,918 A 12/1974 Black
(Continued)

FOREIGN PATENT DOCUMENTS

CN 1027873 C * 3/1995 ........... B24C 7/0084
DE 3802251 A1 * 8/1989 ............. A61C 3/025
(Continued)

OTHER PUBLICATIONS

English Translation of Specification of EP 2193758 A1. (Olmo Oliver, Donnet Marcel) Jun. 9, 2010. Espacenet [retrieved on Aug. 15, 2021], (Year: 2010).*

(Continued)

*Primary Examiner* — Jacqueline T Johanas
*Assistant Examiner* — Holly T. To
(74) *Attorney, Agent, or Firm* — Cantor Colburn LLP

(57) ABSTRACT

Teeth cleaning system, in particular dental powder jet cleaning system, including a powder container having an inlet for compressed air, and where the powder container has an outlet for a powder/air mixture, and where the outlet communicates with a pipe system via which a fluid is passed, in particular a powder/air mixture which is formed in the powder container and from which powder container can be led, where a flow resistance of the inlet is configured relative to a flow resistance of the outlet and/or of the pipepipe system in such a way that a predetermined pressure loss is set across the inlet.

7 Claims, 2 Drawing Sheets

(58) Field of Classification Search
USPC .......................................................... 433/88
See application file for complete search history.

(56) References Cited

U.S. PATENT DOCUMENTS

| | | | | |
|---|---|---|---|---|
| 4,487,582 A * | 12/1984 | Warrin | ................... | B24C 7/0069 |
| | | | | 433/88 |
| 6,457,974 B1 * | 10/2002 | Sharp | ...................... | A61C 3/025 |
| | | | | 433/88 |
| 7,011,521 B2 | 3/2006 | Sierro | | |
| 2003/0003849 A1 * | 1/2003 | Groman | ................... | A61C 3/025 |
| | | | | 451/36 |
| 2008/0233540 A1 * | 9/2008 | Olmo | ..................... | B24C 7/0046 |
| | | | | 433/215 |
| 2009/0246730 A1 | 10/2009 | Takamori | | |
| 2014/0104973 A1 * | 4/2014 | Don | ....................... | B24C 7/0046 |
| | | | | 366/101 |

FOREIGN PATENT DOCUMENTS

| | | | | | |
|---|---|---|---|---|---|
| DE | 4122980 A1 * | 1/1993 | ............. | A61C 3/025 |
| DE | 202004019305 U1 * | 4/2006 | ............. | A61C 3/025 |
| DE | 102011014762 A1 * | 9/2012 | ............. | A61C 3/025 |
| DE | 102016124212 A1 * | 6/2018 | ......... | A61C 17/0217 |
| EP | 0119735 A1 | 9/1984 | | |
| EP | 0522485 A1 * | 1/1993 | ............. | A61C 3/025 |
| EP | 0643947 A1 | 3/1995 | | |
| EP | 0643947 A1 * | 3/1995 | ........... | B24C 7/0053 |
| EP | 643947 A1 * | 3/1995 | ............. | A61C 3/025 |
| EP | 1346700 A1 * | 9/2003 | ........... | A61C 1/0076 |
| EP | 1972295 A1 | 9/2008 | | |
| EP | 1972295 A1 * | 9/2008 | ........... | B24C 11/005 |
| EP | 2193758 A1 * | 6/2010 | ........... | B24C 11/005 |
| EP | 2578361 A1 * | 4/2013 | ........... | B24C 7/0053 |
| EP | 3162404 A1 * | 5/2017 | ............. | A61C 3/025 |
| EP | 3202364 A1 * | 8/2017 | ............... | B24C 9/00 |
| FR | 2588182 A1 * | 4/1987 | ............. | A61C 3/025 |
| JP | H11104149 A | 4/1999 | | |
| JP | 2007190295 A | 8/2007 | | |
| WO | WO-9635390 A1 * | 11/1996 | ............. | A61C 3/025 |
| WO | WO-2004037109 A2 * | 5/2004 | ............. | A61C 3/025 |

OTHER PUBLICATIONS (Joe Redish, Karen Carleton), "Internal Flow—the HP equation", https://www.compadre.org/nexusph/course/Internal_flow_--_the_HP_equation, Oct. 26, 2011 [retrieved on Sep. 9, 2021] (Year: 2011).*

International Preliminary Report on Patentability for corresponding application PCT/EP2017/072793 filed Sep. 12, 2017, dated Apr. 11, 2019.

International Search Report for corresponding application PCT/EP2017/072793 filed Sep. 12, 2017; dated Nov. 10, 2017.

* cited by examiner

TOOTH CLEANING SYSTEM, POWDER CONTAINER AND INSERT FOR A POWDER CONTAINER

TECHNICAL FIELD

The present disclosure concerns a tooth cleaning system, in particular a dental powder jet cleaning system, a powder container and an insert for a powder container.

BACKGROUND

Tooth cleaning systems of the type in question are known, for example, from EP 1 972 295 and generally comprise a powder container or a powder chamber for storing a dental cleaning powder or for mixing it with air, in particular compressed air, in order to produce a powder/air mixture which can then be used for cleaning teeth, for example by means of a suitable hand piece, optionally including addition of water. It is common practice to place the powder container(s) in or on a machine or on an appropriate station. Via this station, air is supplied at a certain pressure. Depending on the embodiment of the station or the powder container, the aforementioned powder/air mixture is also discharged from the powder container via the station.

Depending on the type of (tooth cleaning) powder used, the pressure in the powder container must be set or selected accordingly in order to ensure suitable turbulence. In particular, the particle/particle size of the powder is a decisive influencing factor, since, for example, very fine powders require a lower pressure than coarser powders.

From the state of the art it is known to equip the stations with a sensor system and corresponding pressure regulators, by means of which it can be recognised which "type" powder is currently being used or which "type" of powder container is currently connected to the station. The pressure regulator then regulates the desired air pressure, usually in or upstream of the station carrying the powder container.

The problem here is that this approach is extremely complex: the powder containers must be appropriately configured such that they can also be "recognized", the sensors must work reliably to recognize the different types of powder containers, and the "computing power" in the station must be provided to process the information collected and to control the pressure regulator, etc. In addition, it must be ensured that all of the aforementioned components, whether mechanical, electronic or software, function perfectly in order to ensure smooth operation.

BRIEF SUMMARY

The disclosure concerns a tooth cleaning system, a powder container and an insert for a powder container, which eliminate the aforementioned disadvantages and simplify the adjustment of a pressure in the powder container.

A tooth cleaning system, in particular a dental powder jet cleaning system, according to the disclosure comprises a powder container, wherein the powder container has an inlet, in particular for compressed air, and wherein the powder container has an outlet spaced from the inlet, in particular for a powder/air mixture, and wherein the outlet communicates with a pipe system, via which a fluid, in particular a powder/air mixture formed in the powder container, can be led out of the powder container in such a way that a flow resistance of the inlet is configured, in particular dimensioned, relative to a flow resistance of the outlet and/or of the pipe system in such a way that a predetermined pressure loss is set across the inlet.

The outlet is preferably located at the upper end of the powder container and leads the powder/air mixture to the outside via a separate pipe. Further preferably, the inlet ends at the entry to the powder container, i.e. especially at the lower end of the powder container, so that the compressed air whirls up powder at this end and leads it with the air stream into a vortex chamber, which is formed for example by an insert arranged in the powder container.

According to a embodiment, the tooth cleaning system comprises a station or a (basic) device on which the powder container, preferably interchangeable, is arranged. A suitable connection area is provided at the station for this purpose or several connection areas if several powder containers are to be connected. The connection area has appropriate connections for leading compressed air into the powder container. The mentioned piping system can be connected directly to the powder container, or alternatively it can be configured or arranged in the aforementioned station. The discharge of the powder/air mixture formed in the powder chamber can therefore also take place via the station, to which an appropriate pipe is arranged, which is also part of the pipe system.

The pipe system preferably ends in a hand piece which is connected to the station or to the powder container by the pipe system. In the hand piece, in the piping system or even within the station, the powder/air mixture can still be mixed with water, for example, according to various embodiments. The hand piece is also to be understood as part of the piping system.

The decisive factor is that the flow resistance of the inlet is dimensioned relative to the flow resistance of the outlet and/or the pipe system in such a way that a predetermined pressure loss is or can be set across the inlet. Therefore, no complex sensors and no pressure regulator have to be provided in order to generate the desired pressure in the powder container. In particular, the "information transfer" from the powder container to the station and the associated complexity can be dispensed with. A desired pressure level is rather achieved by adjusting the flow resistances, in particular by adjusting a "ratio" of the flow resistances. The level of pressure in the powder container is decisively responsible for the production of the powder/air mixture and varies in particular with the type of powder used. Especially, when using very fine powders, for example, the pressure must be lower than in the case of using powders with larger particle sizes. By adjusting the flow resistance of the inlet relative to the flow resistance of the outlet of the powder container and/or the pipe system, a given pressure loss can be set across the inlet or a desired pressure level can be set in the powder container.

The powder container is the component which serves to store the powder and in which, in general, the mixing or swirling with the compressed air takes place. The powder container can also be configured in several parts in such a way that it comprises a powder chamber in the form of an insert in which the powder is stored and in which the turbulence with or admixture of the air takes place. It is advisable for the powder container to have a corresponding base element and a corresponding lid element. The aforementioned inlet and/or outlet may also be located directly in or on the powder chamber.

It is advantageous when the flow resistance of the outlet and/or the pipe system is taken into account when dimensioning or forming the flow resistance of the inlet. In particular, the flow resistances are determined by throttle cross-sections or by their size.

According to an embodiment, the inlet comprises an inlet nozzle and an aperture, the aperture having an inlet throttle cross-section which determines the flow resistance of the inlet.

Alternatively, the aperture can also be dispensed with, so that the relevant inlet throttle cross-section is a throttle cross-section of the inlet nozzle that can be preset in particular.

The flow resistance of the outlet is appropriately determined by a reference throttle cross-section, the reference throttle cross-section being an outlet throttle cross-section of the outlet and/or a throttle cross-section of the pipe system. In particular, the reference throttle cross-section is a minimum throttle cross-section, which can be the outlet throttle cross-section or a throttle cross-section of the pipe system, for example of the hand piece. The reference throttle cross section is therefore, in relation to a flow direction of the powder/air mixture, a throttle cross section which is arranged behind the inlet throttle cross section. The reference throttle cross section is a minimum throttle cross section in particular because the minimum throttle cross section most clearly influences the flow resistance of the overall system as soon as the fluid is moved.

The inlet throttle cross-section is preferably smaller than or equal to the reference throttle cross-section. The throttle cross-sections are preferably configured as round, especially circular, openings.

According to a preferred design, an air pressure before inlet, e.g. still within the station, is about 4.2 to 4.8 bar, e.g. 4.5 bar. With an inlet throttle cross-section of about 0.6 mm in diameter and a reference throttle cross-section that is slightly larger, a pressure in the powder chamber of about 2.8 to 3.2 bar, for example 3.0 bar, can be realized. If the reference throttle cross-section is similar or approximately the same size as the inlet throttle cross-section, for example also with a diameter of about 0.6 mm, a pressure of about 2.9 to 3.5 bar can be set in the powder container, for example 3.2 bar. The pressure loss across the inlet is therefore lower.

On the other hand, if the inlet throttle cross section is larger than the reference throttle cross section, for example 0.8 mm, a pressure in the powder container of about 3.4 to 4 bar, for example 3.7 bar, is caused. It should be noted that the above pressure values always refer to the dynamic pressure, i.e. the pressure that is generated during treatment or operation, not the resting pressure.

A pressure of up to 4 bar would already be far too high for the turbulence of very fine powders, for example with an average particle size of less than about 25 µm. By reducing the inlet throttle cross-section, the pressure level can be reduced significantly with advantage. The decisive factor here is that it is not sufficient to simply reduce an inlet throttle cross-section in order to increase a pressure loss. It is also important to consider the (following) reference throttle cross-section. As the previous example shows, despite a reduction in the inlet throttle cross-section, the pressure level in the powder container can be increased again slightly if necessary, depending on its size relative to the reference throttle cross-section.

In preferred embodiments, a diameter of the inlet throttle cross-section is in a range from about 0.4 to 1.8 mm, preferably in a range from about 0.6 to 1.2 mm, particularly preferred between 0.5 and 1.0 mm, e.g. 0.8 mm. The same applies to the reference throttle cross-section. A ratio of the diameter of the inlet throttle cross section to the diameter of the reference throttle cross section in preferred embodiments in a range from about 0.2 to 1.2, particularly preferred in a range from about 0.3 to 1.

It should be noted that the reference throttle cross-section is usually the nozzle cross-section on the hand piece, since the greatest possible energy must be available to accelerate the powder particles. However, the reference throttle cross-section does not always have to be the narrowest, i.e. smallest, cross-section in the pipe system, because the inlet throttle cross-section can also have a comparable diameter or even a slightly smaller diameter for effective pressure reduction.

The above examples show that the pressure level in the powder container can be set very precisely by taking the reference throttle cross-section into account when dimensioning the inlet throttle cross-section. The air pressure provided by the station can always be at the same/similar level (e.g. approx. 4.5 bar) and advantageously does not have to be regulated by pressure regulators as is the case with state-of-the-art technology.

In preferred embodiments, a pressure drop that can be achieved via the inlet using the above sizes and ratios is about 10-70%, preferably between 20 and 50%.

The available air pressure according to a preferred version of the disclosure is preferably between 2.5 and 5 bar. The nozzle cross section on the hand piece as the determining factor for air and powder quantity is then about 0.65 mm—variations of +/−0.15 mm are conceivable. This results in preferred cross-sections for the inlet throttle cross section also within a range of +/−0.2 mm to the nozzle cross section on the hand piece. The inlet throttle cross sections thus move in a range of about +/−30% to the reference throttle cross section, with preferred embodiments between −10% and +25%. The diameter of the inlet nozzle for turbulence is 1 mm for this preferred embodiment.

Advantageously, the inlet according to an embodiment comprises a duckbill check valve or a lip check valve, which is preferably arranged between the aperture and the inlet nozzle. In particular, the duckbill check valve is arranged in such a way that it can be opened in the direction of flow by the (air) pressure applied. This means that the inlet via the duckbill valve is automatically closed when no pressure is applied. Such a powder container can be removed and handled without powder escaping which would contaminate the treatment room. Alternatively, the duckbill check valve can also be positioned in front of the aperture when viewed in the direction of flow. Alternatively, the use of an aperture can also be dispensed with.

It is appropriate for the inlet to comprise a first adjusting device configured to regulate the pressure drop or to adapt its height, in particular by adjusting the inlet throttle cross section. In accordance with a preferred embodiment, the aperture is interchangeable or exchangeable. The aperture may, for example, be formed by a tube insert which has an opening at one of its ends which acts as an "aperture". This opening may also be smaller than the diameter of the pipe insert, so that "different" pipe inserts can easily be used, which only slightly differs in the form of the opening. The aperture can also be a plate-shaped/plane component which comprises one or more openings acting as throttle cross-sections of different sizes. It is advantageous to set a different inlet throttle cross section by twisting or shifting this component, depending on which inlet throttle cross section is currently to be "active/flowed through". Alternatively, the component as such is also configured to be interchangeable.

In addition or alternatively, according to an embodiment, the inlet (as such) is formed as an insert which is interchangeable, the insert being, for example, a bottom element of the powder container or part of a bottom element of the powder container.

According to an embodiment, the insert and/or aperture is configured to inform about or to indicate a pressure drop level or (set) pressure level in the powder container, for example by pattern and/or colour coding or dimensioning of the insert. In a similar way, the powder container can of course also be coded as such. If the hand piece includes the reference throttle cross-section, the pressure in the powder container can be adjusted automatically by combining the "correct" components, for example by matching the colour of the hand piece and the powder container or the insert or aperture plate, without the need for sensors.

The reference throttle cross section can be adjusted by a second adjustment unit in accordance with one embodiment. Here, too, appropriate aperture plates can be used in the pipe system at the appropriate locations.

According to an embodiment, the reference throttle cross-section can be adjusted by replacing one or more nozzles, for example in the piping system or in the hand piece. In particular, the reference throttle cross section can also be adjusted by the hand piece itself. The inlet nozzle as such can also be configured to be interchangeable, whereby the exchange is particularly advantageous if a corresponding insert is used. In contrast to the inlet nozzle, this is advantageously "recognizeble" from the outside, so that a user can quickly see what pressure level this container provides, for example.

The disclosure also concerns a powder container as such, in particular for a tooth cleaning system in accordance with the disclosure, having an inlet for a fluid, in particular for compressed air, an inlet throttle cross-section of the inlet being adjustable.

The disclosure concerns also an insert for a powder container according to the disclosure, wherein the insert includes the inlet. The advantages and characteristics mentioned in connection with the tooth cleaning system apply analogously and accordingly to both the powder container according to the disclosure and the use according to the disclosure.

BRIEF DESCRIPTION OF THE DRAWINGS

Further advantages and characteristics result from the following description of a preferred embodiment, in particular a powder container, in relation to the attached figures.

Show it.

DETAILED DESCRIPTION

Figure 1:
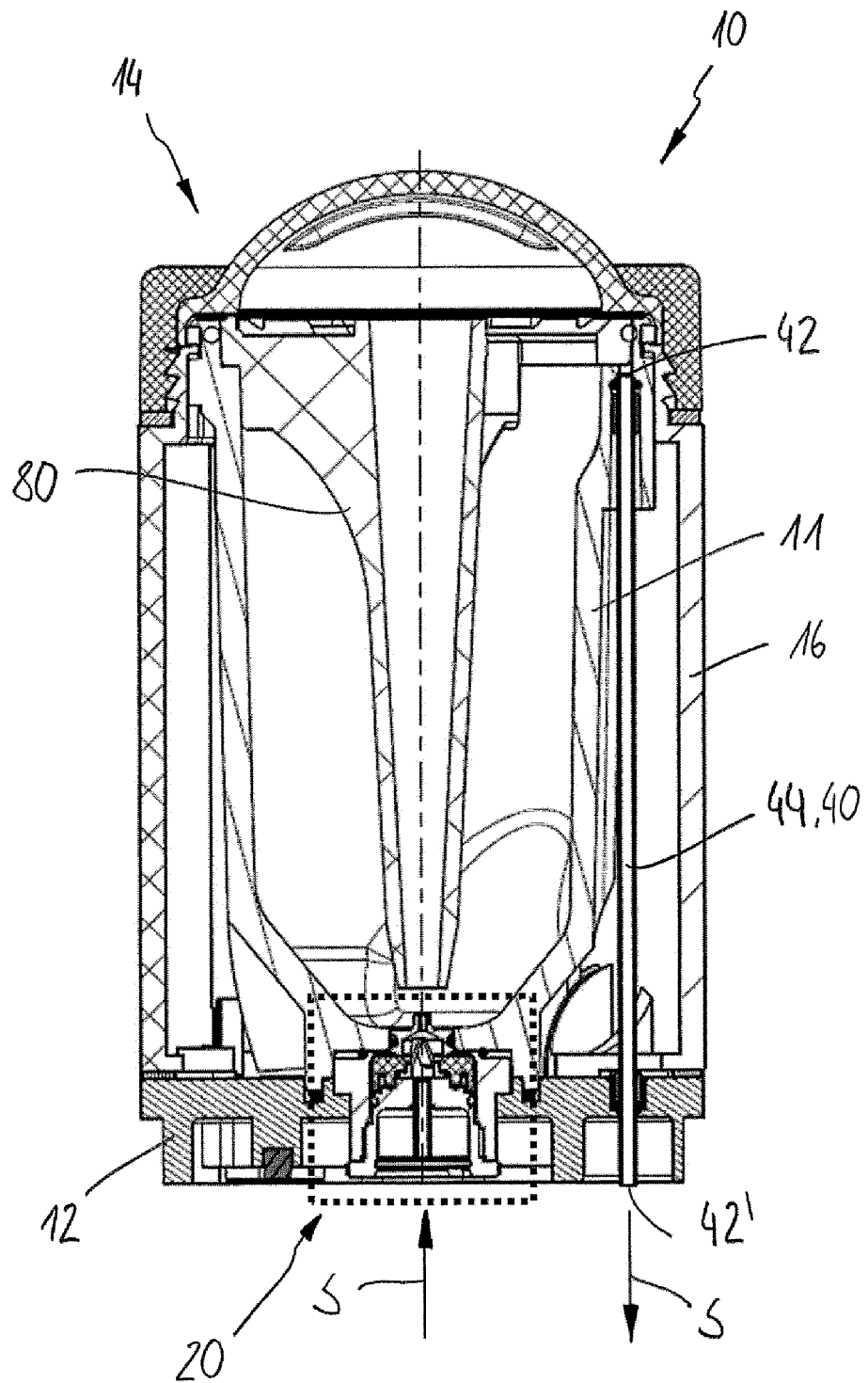
FIG. 1: a sectional view of a preferred embodiment of a powder container.

FIG. 1 shows in a sectional view a powder container 10 comprising a wall 16 within which a powder chamber 11 configured as an insert is arranged. At its lower end the powder container 10 has a base element 12, at its upper end a cover element 14. Inside the powder chamber 11 a Venturi tube 80 is arranged. Not shown is a powder which is inside the powder chamber 11. The vertical arrow pointing in the direction of the powder container 10, marked with the reference sign S, indicates a flow direction, in particular an inlet flow direction of (compressed) air. The powder container 10 also contains an outlet pipe 44 forming an outlet 40, through which a powder/air mixture formed within the powder chamber 11 is discharged. Here, also, an arrow pointing downwards with the reference sign S indicates in this case a flow direction, in particular an outlet flow direction. In this example, the powder container 10 comprises two outlet throttle cross-sections 42, 42'. The two outlet throttle cross-sections 42, 42' can represent a reference throttle cross-section. Optionally, however, only the smaller of the two outlet throttle cross-sections 42, 42' represents the reference throttle cross-section. The decisive factor is the interaction of the reference throttle cross-section with the form or dimensioning of the inlet 20. The reference throttle cross-section can also be determined by a pipe system not shown here. The dotted area of the powder container 10, which includes inlet 20, is shown in detail in FIGS. 2 and 3.

Figure 2:
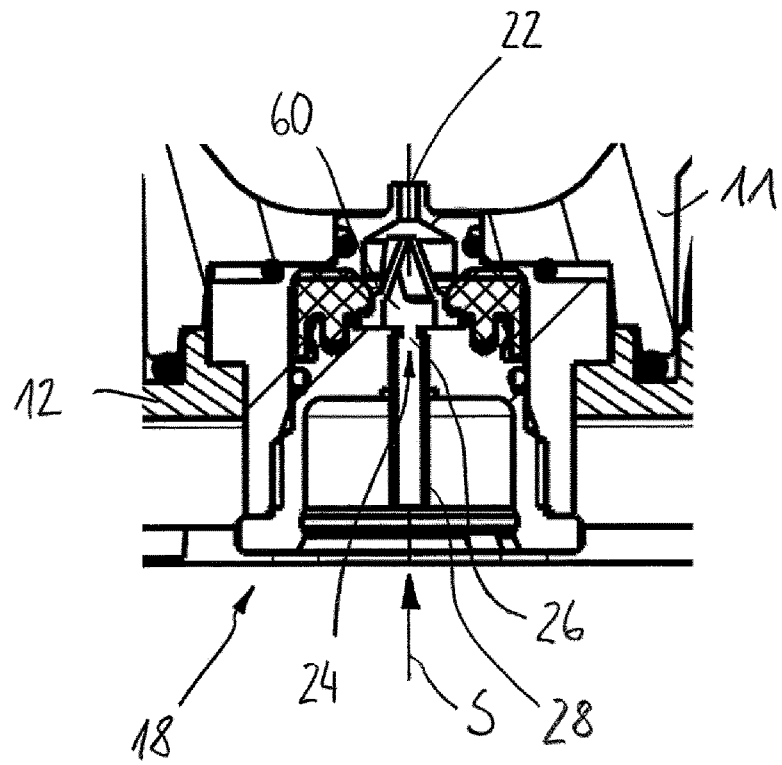
FIGS. 2 and 3: partial views, as sketched in FIG. 1, with inlets generating different flow resistances.

FIG. 2 shows the area sketched in FIG. 1 in a detailed illustration. The bottom element 12 in particular can be seen, in which an insert 18 is arranged, which comprises an inlet nozzle 22, whereby a duckbill check valve or a lip check valve 60 is arranged in front of the inlet nozzle 22 as seen in the direction of flow S. In front of this in turn is an aperture 24, which has an inlet throttle cross-section of 26. In the embodiment shown here, the aperture plate 24 is configured as part of a tube insert 28, which may be interchangeable.

Figure 3:
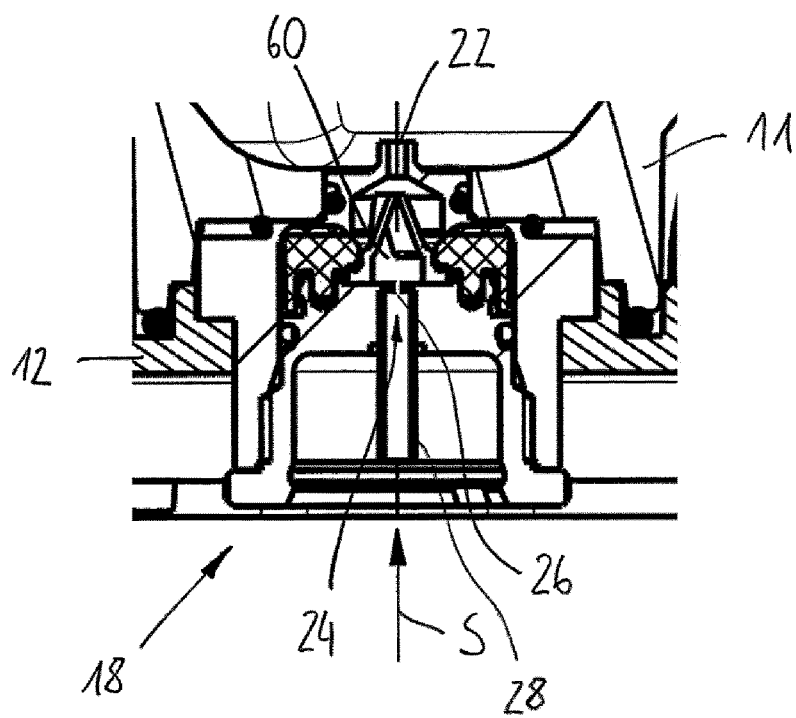

With reference to FIG. 3, it can be clearly seen that an inlet throttle cross-section 26 shown there is considerably larger. The figures do not differ from each other, so that no further explanations are given.

It can clearly be seen that the duckbill check valve or the lip check valve 60 is arranged in such a way that it can be opened by a pressure, in particular an air pressure, along the direction of flow S. The valve can be opened by means of a pressure, in particular an air pressure. If no pressure is applied, the duckbill check valve or the lip check valve 60 is automatically closed and no more powder can escape via the inlet nozzle 22. In the design shown in FIGS. 1 to 3, the insert 18 is even formed in multi-part, in particular in two-part, and sealed against each other and against the powder chamber 11 by means of corresponding sealing elements, cf. the O-rings not specified here in more detail. The floor element 12 has a corresponding geometry for arrangement at a station/(basic) device not shown here, via which the air pressure can be introduced into the powder container 10 and the powder/air mixture discharged. The outlet throttle cross-sections 42 and 42' shown in FIG. 1 are given as possible reference throttle cross-sections. However, a reference throttle cross-section can also, as mentioned above, be formed in a pipe system not shown here, which is located in the station or in the line to the handpiece or in the handpiece itself.

The invention claimed is:

1. A tooth cleaning system comprising
a powder container,
  wherein the powder container has an inlet for compressed air,
  wherein the powder container has an outlet spaced from the inlet for a powder and-air mixture,
  wherein the outlet is connected to a pipe system, via which the powder and air mixture can be led out from the powder container,
  wherein a flow resistance of the inlet is configured relative to a flow resistance of the outlet and/or of the pipe system in such a way that a predetermined pressure loss is set across the inlet, wherein the inlet comprises an inlet nozzle and an aperture, wherein the aperture has an inlet throttle cross-section, which determines the flow resistance of the inlet, wherein the flow resistance of the outlet is determined by a reference throttle cross-section, wherein the reference throttle cross-section is an outlet throttle cross-section of the outlet and/or a throttle cross-section of the pipe system, wherein the inlet throttle cross section is less than or equal to the reference throttle cross section, and wherein the inlet comprises a first adjusting device which is configured to regulate the pressure loss by means of an adjustment of the inlet throttle cross-section.

2. The tooth cleaning system according to claim 1, wherein the inlet comprises a duckbill check valve or lip check valve, arranged between the aperture and the inlet nozzle.

3. The tooth cleaning system according to claim 1, wherein the aperture is configured to be interchangeable.

4. The tooth cleaning system according to claim 1, wherein the inlet is formed as an insert which is interchangeably configured, and wherein the insert is a bottom element of the powder container.

5. The tooth cleaning system according to claim 4, wherein the insert and/or aperture is configured to inform about or to indicate a pressure loss level, by pattern and/or colour coding or dimensioning of the insert.

6. The tooth cleaning system according to claim 1, wherein the reference throttle cross-section is adjustable by a second adjustment unit.

7. The tooth cleaning system according to claim 1, wherein the reference throttle cross section is adjustable by replacing one or more nozzles.

* * * * *